United States Patent
Grubb et al.

(10) Patent No.: US 6,781,088 B2
(45) Date of Patent: Aug. 24, 2004

(54) PIN TO THIN PLATE JOINT AND METHOD FOR MAKING THE JOINT

(75) Inventors: Kenneth Grubb, Snyder, NY (US); Philip Wutz, Williamsville, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 104 days.

(21) Appl. No.: 10/242,096

(22) Filed: Sep. 12, 2002

(65) Prior Publication Data

US 2004/0052574 A1 Mar. 18, 2004

(51) Int. Cl.[7] .................. B23K 26/20; F16B 12/04; B25G 3/34
(52) U.S. Cl. .................. 219/121.64; 228/136; 403/270
(58) Field of Search .................. 219/121.6, 121.63, 219/121.64, 121.65, 121.66, 121.85; 228/135, 136; 403/270

(56) References Cited

U.S. PATENT DOCUMENTS

| | | | |
|---|---|---|---|
| 2,018,073 A | * 10/1935 | Laise Clemens | ............ 200/268 |
| 3,279,051 A | 10/1966 | Minshall | |
| 3,528,173 A | 9/1970 | Gall | |
| 3,823,464 A | * 7/1974 | Chartet | ........................ 228/136 |
| 4,121,044 A | 10/1978 | Hadersbeck et al. | |
| 4,216,576 A | * 8/1980 | Ammon et al. | ................. 29/845 |
| 4,326,117 A | * 4/1982 | Kanne et al. | ............ 219/85.15 |
| 4,551,914 A | 11/1985 | Stiggelbout | |
| 4,624,405 A | * 11/1986 | Newell | ........................ 228/212 |
| 4,970,624 A | 11/1990 | Arneston et al. | |
| 5,362,282 A | * 11/1994 | Lickton | ....................... 474/220 |
| 5,547,123 A | 8/1996 | Gumbert | |
| 6,032,359 A | 3/2000 | Carroll | |
| 6,096,455 A | 8/2000 | Satake et al. | |
| 6,203,386 B1 | * 3/2001 | Checchinato et al. | ........ 439/877 |

FOREIGN PATENT DOCUMENTS

| | | |
|---|---|---|
| FR | 2 797 206 | 2/2001 |
| JP | 2002289275 A | * 10/2002 |
| SU | 1386336 A1 | 4/1988 |

* cited by examiner

Primary Examiner—Samuel M. Heinrich
(74) Attorney, Agent, or Firm—Michael F. Scalise

(57) ABSTRACT

A pin to plate joint and method of making the joint comprising a plate comprising an entry side and an exit side with the plate defining cutouts, and the pin movable through the plate from the entry side to the exit side and in doing so pushes tab members at angles to the exit side of the plate at bends. The bends in the plate define an opening in the plate, and flow spaces are defined between the pin sidewall and the bends in the plate, with the tab members being heated to form melted tab material and flowing the melted tab material into the flow spaces and cooling, forming a pin to plate joint.

24 Claims, 7 Drawing Sheets

PIN TO THIN PLATE JOINT AND METHOD FOR MAKING THE JOINT

BACKGROUND OF THE INVENTION

1. Field of the Disclosure

The present disclosure relates generally to a connective structure for a pin to planar substrate.

2. Prior Art

Presently, there is high demand for goods and products, such as implantable medical devices and electronics, wherein a small diameter pin or terminal needs to be joined with a thin plate. However, joining a thin plate to a small diameter pin is a delicate art, and to date there is no quick and efficient method to create a reliable joint between the two.

For example, a past attempt to join a pin to a substrate is shown in U.S. Pat. No. 6,032,359. In this patent, a laser is employed to cut a pattern of flaps in a substrate that is made of flexible polymeric dielectric film. The pin is then inserted through the substrate flaps in the location of the cut pattern. The resilience of the flaps holds the pin therebetween by simply gripping the pin. The pin may be readily removed from between the flaps, and when done, the flaps return to their initial position. However, this reference does not show a structure that permanently joins the pin to the substrate.

An example of joining a plate and shaft is U.S. Pat. No. 5,547,123, which shows a method of securing an apparatus part in a hole defined in a base metal plate. In this patent, a circular shaft is disposed in a hole defined in a base plate, and then the two are welded together by a laser that melts adjoining material portions of the base plate and the part. However, the bond formed between the base plate and part is not of optimum strength, as the laser welding consumes a portion of the base metal surrounding the hole. In other words, the base plate has a localized zone around the weld that is thinner than the surrounding base plate, and it is in this zone that potential stress fractures may develop.

In yet other attempts to hold a pin to a substrate, the pin is pushed through the substrate and joined thereto with an adhesive. Oftentimes, these adhesives are simply unable to withstand subsequent heating of the pin and substrate assembly, thus limiting the utility of this method of joining small diameter pins with thin plates.

Thus, there is a need for a joint that connects a small diameter pin with a thin plate, along with a methodology for making the joint. There is also a need for the completed joint to be sturdy and durable, yet still made in a quick efficient process.

SUMMARY OF THE INVENTION

The present pin to thin plate joint and method for making the joint provides for a new joint and a method for making a joint between a small diameter pin (terminal) and a thin plate (substrate). A superior joint is formed that is incredibly strong, yet still of the caliber that it may be made quickly, repeatedly, and efficiently. The assembled plate and pin may then be utilized in a flexible circuit.

The thin plate itself may define a first cutout, a second cutout, a third cutout, and a fourth cutout, that are arranged on the plate in an X-shaped pattern (X-shaped cutout). The thin plate further comprises an entry side and an exit side. The pin is alignable with the X-shaped cutout, and its contact end is movable through the plate from the entry side of the plate to the exit side. As this is done, a first tab member, a second tab member, a third tab member, and a fourth tab member are raised from the plate, such that the first tab member is adjacent to the second tab member, the second tab member is adjacent to the third tab member, the third tab member is adjacent to the fourth tab member, and the fourth tab member is adjacent to the first tab member. A rectangular opening is thus defined in the plate and flow spaces are defined between the sidewall of the pin and the tabs. Further, each of the tab members is triangular-shaped and each has a tip.

After the pin passes through the plate, the raised tab members are at substantially right angles with the exit side of the plate, each tab being bent at a bend. Also, the degree to which the pin passes through the plate is variable. That is, the pin is movable through the plate such that the contact end of the pin is: positionable between the exit side of the plate and the tips of the tabs, coplanar with the tips of the tabs, or extendable a distance away from the exit side of the plate (beyond the tabs).

A means for heating is employed to join the pin to plate, which may comprises laser welding. The laser beam generated by the laser is directed on the tabs and melts the tabs. The melt flows into the flow spaces defined between the rectangular opening and the pin. Upon cooling, a joint is formed between the pin and plate that is of high strength and capable of withstanding bending and torqueing without the pin and plate separating.

Thus, the present disclosure provides for a superior joint and method for making the joint between a small diameter pin and a thin plate.

DETAILED DESCRIPTION OF THE PTEFERRED EMBODIMENTS

The present invention provides a new structure and methodology for joining a thin plate 20 and a small diameter pin (pin or terminal) 70 together (FIGS. 1–3), such that a joint 150 is formed (FIG. 4), which is of superior strength, quality, and reliability.

Figure 1:
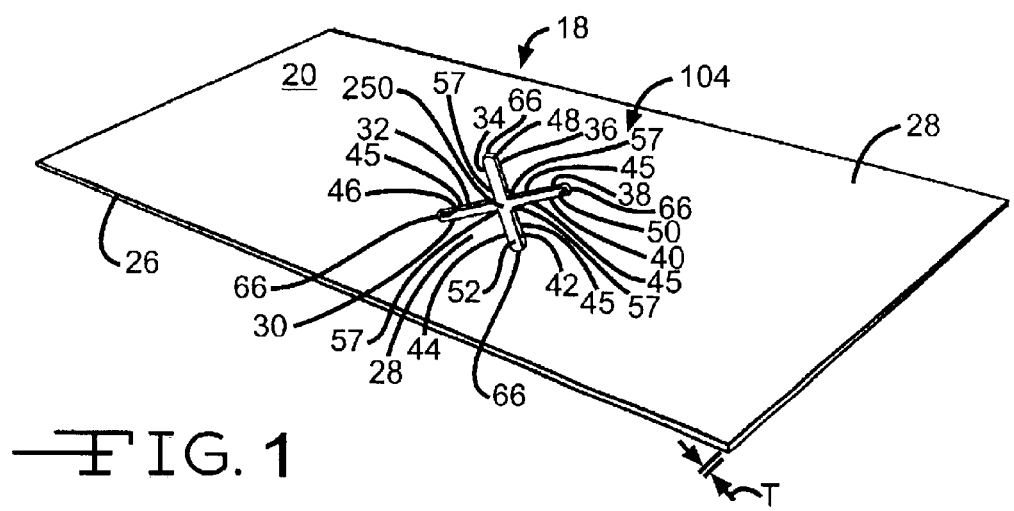
FIG. 1 is a perspective view of the plate.

Turning now to FIG. 1, shown therein is the plate 20 to which a pin (or terminal) 70 is to be joined. A unique joining of the plate 20 and pin 70 is made possible by the configuration of the plate 20. In particular, the plate 20 comprises an entry side 26 and an exit side 28, and also defines an X-shaped cutout pattern designated 104. One of the purposes of the X-shaped cutout pattern 104 is to increase the strength of the joint 150 made in a manner described presently. The pin 70 has a diameter of about 0.014–0.030 inches, and the plate 20 has a thickness (designated T in FIG. 1) of about 0.002 to 0.010 inches. These dimensions are provided for purposes of illustration and not limitation.

The plate (or substrate) 20 comprises a metal or an alloy such as nickel and titanium. The pin 70 comprises a metal or an alloy such as of molybdenum, titanium, stainless steel, and niobium. If the pin 20 and the plate 70 are of the same material, for example both made of titanium, the means for heating 99 is for heating and may comprise a laser 100 for laser welding 106 (to be described presently) or other joining techniques known to those or ordinary skill, results in actual fusion of the pin 70 and plate 20.

As seen in FIG. 1, the plate 20 comprises a first wall 30, a second wall 32, a third wall 34, a fourth wall 36, a fifth wall 38, a sixth wall 40, a seventh wall 42, and an eighth wall 44. The second wall 32 and the third wall 34 are at a substantially right angle to one another and meet at a tip 57, the fourth wall 36 and the fifth wall 38 are at a substantially right angle to one another and meet at a tip, the sixth wall 40 and the seventh wall 42 are at a substantially right angle to one another and meet at a tip 57, and the eighth wall 44 and the first wall 30 are at a substantially right angle to one another and meet at a tip 57. Respective curved end walls 66 join each pair of walls 30 and 32, 34 and 36, 38 and 40, and 42 and 44.

The plate also defines a plurality of cutouts 45. In particular, the first wall 30 and second wall 32 define a first cutout 46 therebetween. The third wall 34 and the fourth wall 36 define a second cutout 48 therebetween. The fifth wall 38 and the sixth wall 40 define a third cutout 50 therebetween. And finally, the seventh wall 42 and the eighth wall 44 define a fourth cutout 52 therebetween. The first cutout 46, second cutout 48, third cutout 50, and fourth cutout 52 are arranged such that they take on the shape of the X-shaped cutout pattern 104 in the plate, as seen in FIG. 1. The plurality of cutouts 45 radiate from a common geometrical point 250, and may be made by laser drilling, stamping, or mechanical cutting the plate 20.

Installation of the Pin

Figure 2:
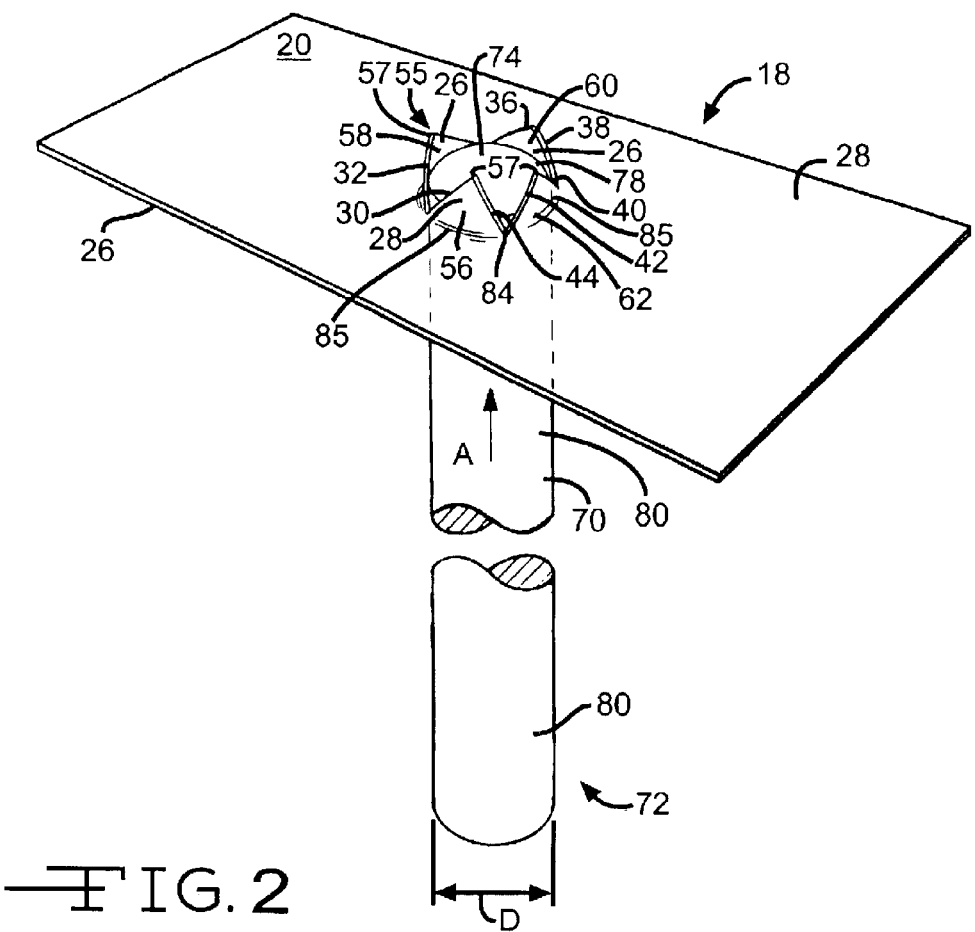
FIG. 2 is a perspective view of the plate with a pin extending therethrough.
Figure 2A:
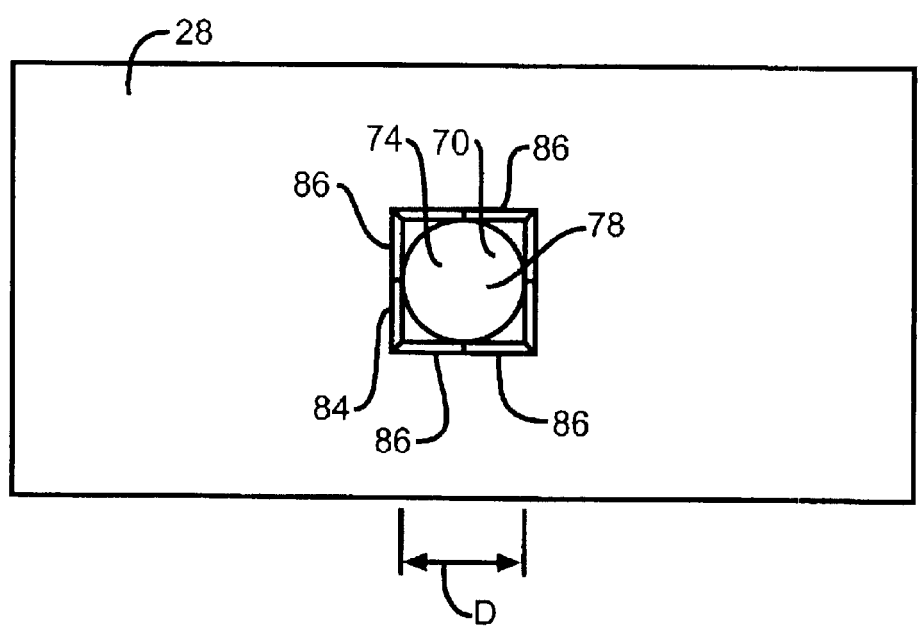
FIG. 2A is a top plan view of the pin after passing through the plate.

With the configuration of cutouts 46,48,50,52 defined in the plate 20, the plate is ready to receive the pin 70. As seen in FIG. 2, the pin 70 comprises a driven end 72 that is forced upon by a driving unit (not show in the figures) which moves the pin 70 in the direction of the arrow designated A (toward the entry side 26 in the plate 20). At the end opposite the driven end 72 is the contact end 74 of the pin 70 comprising a contact surface 78. The pin 70 also has a cylindrical-sidewall 80 of a diameter designated D, as seen in FIGS. 2 and 2A.

Returning to FIG. 1, shown therein is the configuration of the plate 20 prior to contact with the pin 70. The pin 70 is aligned with the cutouts 46,48,50,52 such that it is substantially perpendicular with entry side 26 of the plate 20. Then, the contact surface 78 of the pin 70 moves through the plate 20 as the pin 70 is moved in the direction of arrow A. This results in a plurality of tabs 55 (or tab members 55) pushing out from the exit side 28 of the plate 20. The plurality of tabs 55 comprise first tab member 56, a second tab member 58, a third tab member 60, and a fourth tab member 62, each being pushed to a substantially right angle with the exit side 28 of the plate 20, as seen in FIG. 2. Each of the plurality of tabs 55 are triangular-shaped and each comprise a tip 57.

Each of the raised plurality of tabs 55 is at substantially right angle with the exit side 28 of the plate 20 and extends from the plate 20 at a bend 85. A rectangular opening 84 is thus defined in the plate 20, the bends 85 being the sides of the rectangular opening 84. Additionally, a close fitting relationship is formed between the first tab member 56, second tab member 58, third tab member 60, and fourth tab member 62, and the cylindrical sidewall 80 of the pin 70. In the regions between the cylindrical sidewall 80 of the pin 20 and the bends 85 are defined flow spaces 86, which, as described presently, allow for melted tab material 64 to flow therein. FIG. 2A is a top plan view of FIG. 2 showing the flow spaces 86.

Figure 3:
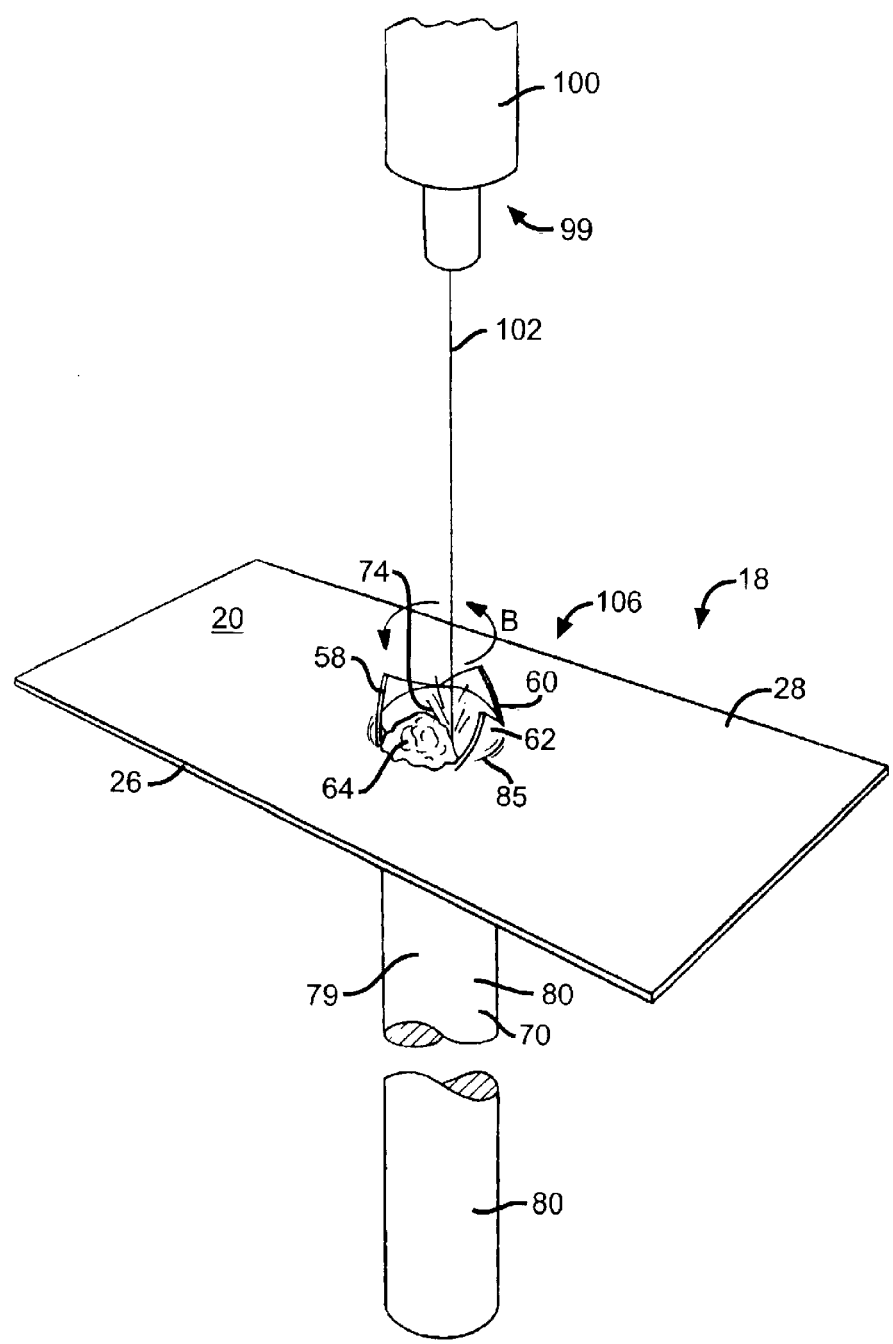
FIG. 3 is a perspective view of the laser welding of the plate to the pin.
Figure 4:
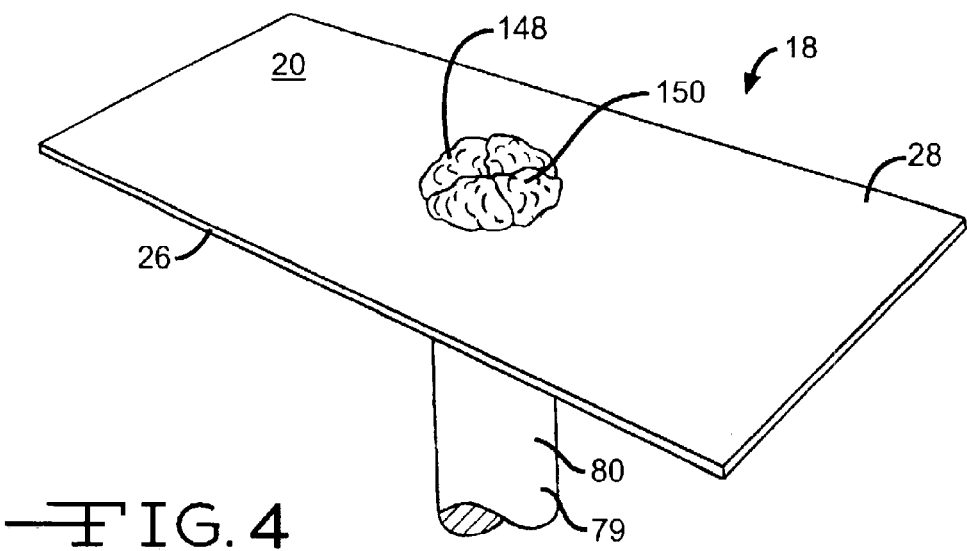
FIG. 4 shows a perspective view of the pin to plate weld joint formed by the laser welding depicted in FIG. 3.

With the pin 70 positioned in the plate 20 as described above, the pin 70 is then joined to the plate 20, as seen in FIGS. 3 and 4. The method of joining the pin 70 to the plate 20 comprises providing a laser 100 for generating a laser beam 102 to provide for laser welding 106. A first method of laser welding 106 entails using the laser beam 102 to heat the contact surface of the pin 78. In that case, the heat is transferred through the pin 70 and then to the tabs 55. In such an embodiment, the pin may be made of molybdenum and the plate may be made of nickel, so that the pin 70 is not melted at all, and only the tabs 55 are melted by the heating, since nickel melts at a lower temperature than molybdenum. If these materials are used, the melted tab material 64 wicks over the contact surface of the pin 70 to form a cap 148 (FIG. 4). After cooling, the joint 150 formed successfully joins the plate 20 to the pin 70, and this joint 150 has high structural integrity and strength. Additionally, another advantage of the completed joint 150 is that it has a low profile with respect to the exit side 28 of the plate 20 (FIG. 4). Another advantage of this method is that the filler material used for the laser welding 106 comes from the plurality of tabs 55, so that the thin plate 20 is not consumed in the joining process. This advantageously provides for the plate 20 retaining its full structural integrity in the vicinity of the joint 150.

Additional advantages of the laser welding 106 depicted in FIG. 3 are that the use of a laser 100 allows welds to be made precisely and quickly, and only a small region of the plate 20 is subjected to high temperatures. Further, the need for fluxes is eliminated in laser welding 106.

Also, the materials comprising the pin 70 and plate 20 may be varied, or, the pin 70 and plate 20 may be of the same material. If they are of the same material, not only is the bond very strong, but also they share the same properties, for example, melting temperature, coefficient of thermal expansion, and conductivity.

Additionally, the laser 100 may be tilted with respect to the plate 20, such that the laser beam 102 strikes the plurality of tabs 55 at an angle. This arrangement is useful when the tabs 55 have a higher melting temperature than the pin 70, so that the tabs 55 melt and wick over the pin without damaging the pin 70 in the process.

Alternative Embodiments

In a first alternative embodiment, the plate 20 may define a cutout other than an X-shaped cutout pattern 104. For example, seen in FIGS. 5–8, the plate 20 comprises an entry side 26 and an exit side 28. The plate 20 defines therein a plurality of cutouts 45, and in particular a first cutout 200, a second cutout 202, and a third cutout 204. The cutouts 45 are at substantially 120-degree angle with respect to one another and are substantially the same length designated L in FIG. 5. The cutouts 45 all radiating from common geometrical point 350.

Figure 5:
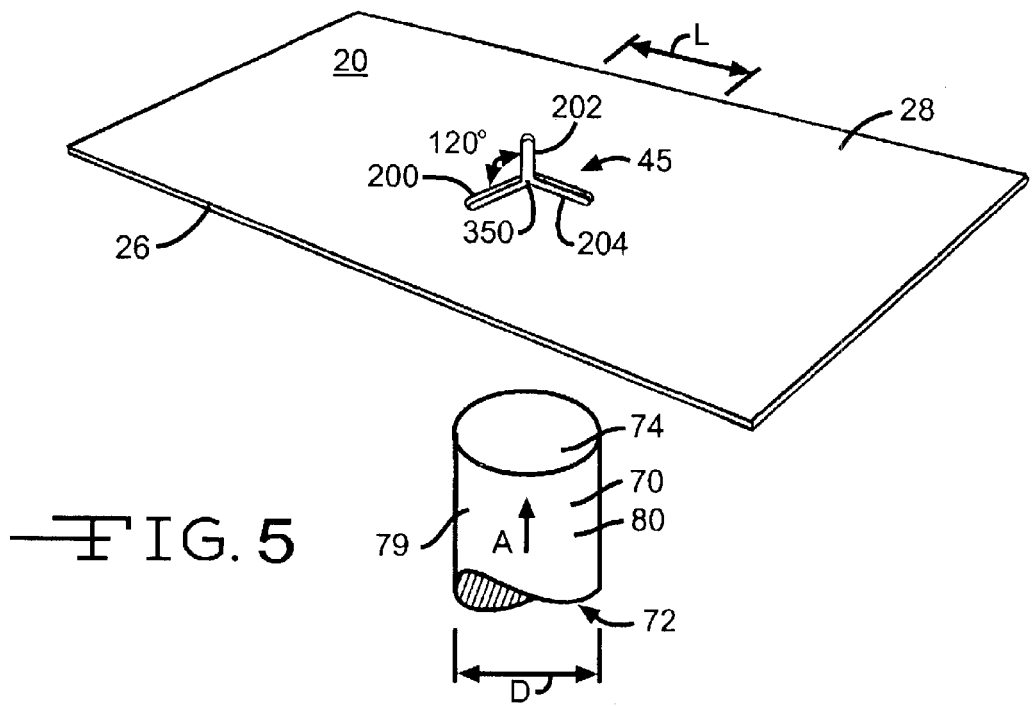
FIG. 5 is a perspective view of a first alternative embodiment wherein the plate comprises three cutouts.
Figure 6:
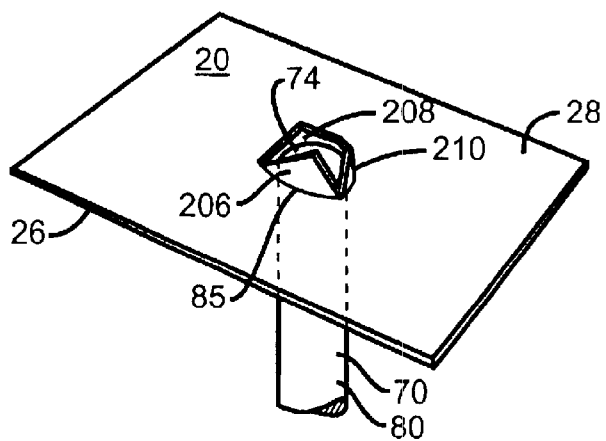
FIG. 6 is a perspective view of a first alternative embodiment as the pin moves through the plate.

The pin 70 is movable through the plate 20 from the entry side 26 to the exit side 28, in the direction of the arrow designated A, as seen in FIG. 5. As the pin 70 moves therethrough it causes a first tab 206, a second tab 208, and a third tab 210 raise from the exit side 28 of the plate 20, each along a bend 85. After the pin 70 passes through the plate 20, the first, second and third tabs 206, 208 and 210 are at a substantially a right angles to the exit side 28. Further, the first tab 206, second tab 208, and third tab 210 each come into a close fitting relationship with the cylindrical sidewall 80 of the pin 70 as the pin 70 passes through the plate 20.

Figure 7:
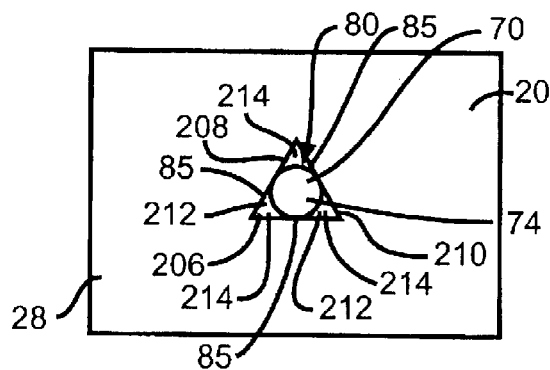
FIG. 7 is a top plan view of the first alternative embodiment.

Turning now to the top plan view in FIG. 7, shown therein is the pin 70 protruding from the plate 20. The configuration of the cutouts 200, 202, and 204 in the plate 20 results in a triangular opening 214 being formed after the pin 70 passes through the plate 20. The sides of the triangular opening 214 are the bends 85 that the first tab 206, second tab 208, and third tab 210 make with the plate 20. Also, flow spaces 214 are defined between the cylindrical sidewall 80 of the pin 70 and the bends 85.

Figure 8:
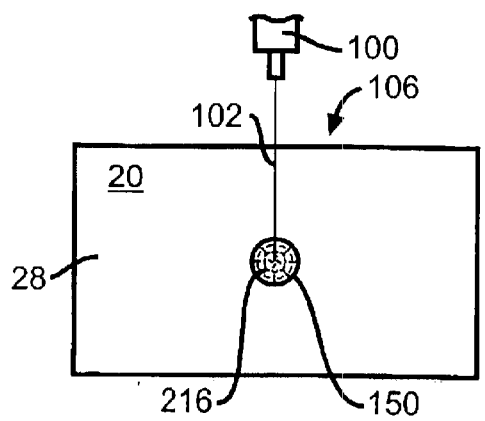
FIG. 8 is a perspective view of the first alternative embodiment showing laser welding of the pin to plate.

Laser 100 generates a laser beam 102 for laser welding 106 the first tab 206, second tab 208, and third tab 210 to the pin 70, thus joining the pin 70 to the plate 20. FIG. 8 shows the finished weld joint 150.

Figure 9:
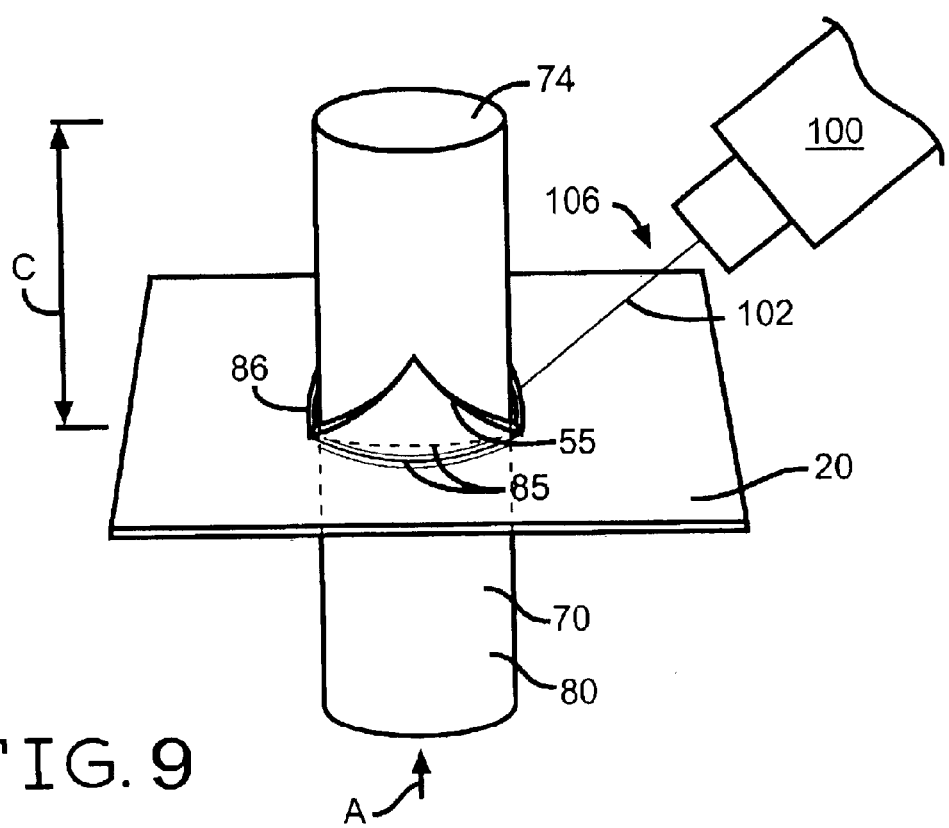
FIG. 9 is a perspective view of the laser welding of a pin to a plate in a second alternative embodiment.
Figure 10:
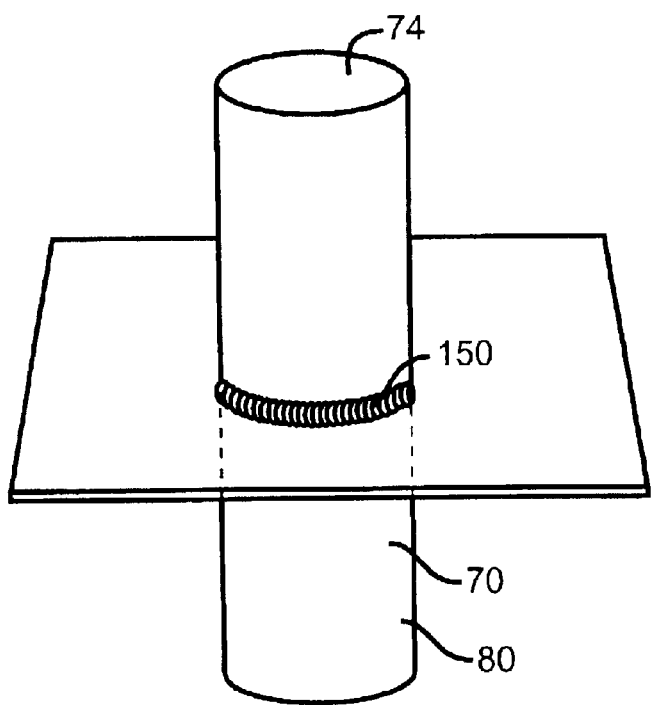
FIG. 10 is a perspective view of the completed pin to plate weld of the second alternative embodiment shown in FIG. 9.

In a second alternative embodiment, shown in FIGS. 9 and 10, the pin 70 protrudes through the plate 20 a distance designated C, such that subsequent laser welding 106 welds the cylindrical sidewall 80 of the pin 70 to the tab members 55. Here, the tabs 55 are raised at right angles to the plate 20, in a manner as previously described, with the laser beam 102 being aimed at the tabs 55. Then, the melted tab material 64 flows into the flow spaces 86 between the cylindrical sidewall 80 of the pin 70 and plate 20. After cooling, the pin 70 and plate 20 are securely joined together at joint 150, seen in FIG. 10. Again, the plate 20 and pin 70 may comprise the materials as described above.

Figure 11:
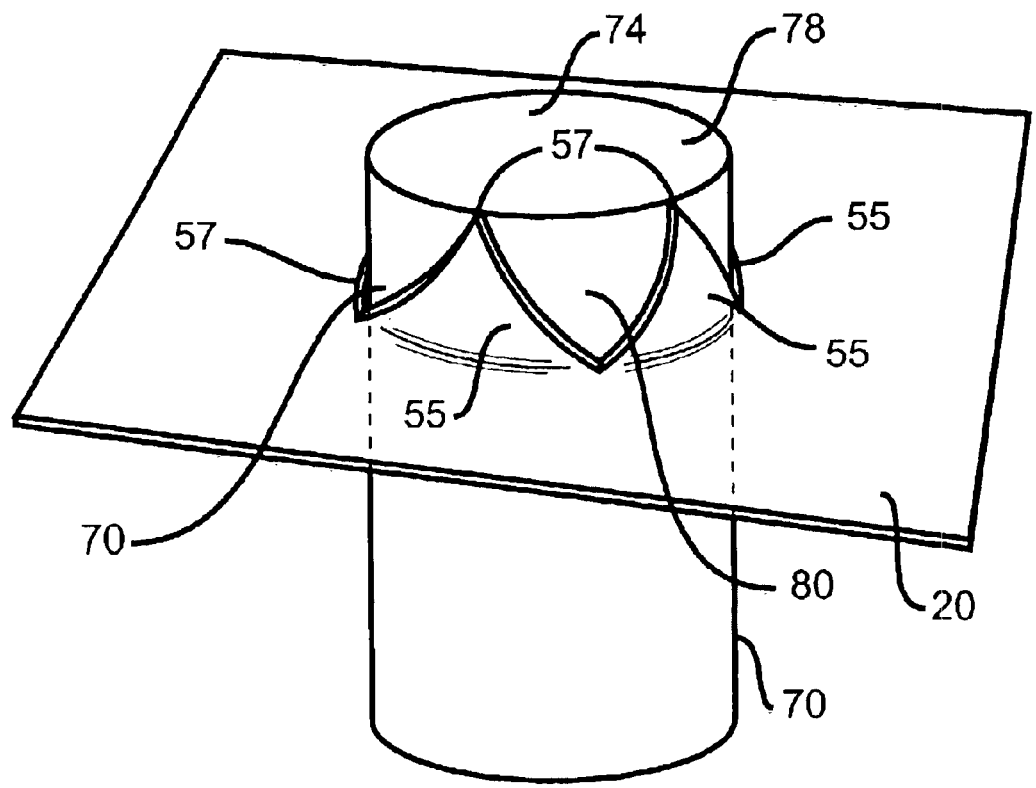
FIG. 11 is a perspective view of a third alternative embodiment of the pin and plate with the contact surface of the pin being flush with the tips of the tabs.

A third alternative embodiment is shown in FIG. 11. In FIG. 11 pin 70 is shown in a position immediately after having been passed through a plate 20 defining a plurality of cutouts that radiate from a common geometric point. As shown in FIG. 11, the tab members 55 are raised and each is at a substantially right angle to the exit side 28 of the plate 20. Here, the contact surface 78 of the pin 70 and each of the tips 57 of the tabs 55 lie in the same plane, that is, the tips 57 are flush with the contact surface 78 of the pin 70. Then the laser welding 106 is conducted in the manner previously described, such that after cooling, a robust, durable, and reliable joint 150 exists between the plate 20 and pin 70.

In other embodiments, the number of cutouts in the plate may be otherwise embodied. For example, the cutouts may number two, five, six, seven, and so forth, until the cutouts become so numerous that there is not enough tab material remaining to provide for adequate laser welding 106.

Additionally, the cutout in the plate 20 may be U-shaped resulting in a U-shaped tab when the pin 70 is moved through the plate 20. Also, the pin, in addition to comprising a circular cross section as shown in FIGS. 2, 2A, 3, 4, and 6, 9–10 may be embodied with a variety of different cross sectional profiles, for example, elliptical, U-shaped, and polygonal. In such embodiments, the cutouts in the plate 20 may be configured and arranged to allow for the passage of the alternatively shaped pin there through in a close fitting relationship.

Joint Geometry

Another of the advantages of the of the present pin 20 to plate 70 joint 150 is in the joint geometry that results after laser welding 106. For example, as the pin 70 moves though the X-shaped cutout 104 in the plate 20, as shown in FIGS. 1–4, the plurality of tabs 55 come into close contact with the pin 70. Simultaneously, flow spaces 86 are defined between the plate 20 and pin 70 sidewall 80. Upon laser welding 106 the flow spaces 86 fill with melted tab material 64. After cooling, a robust, strong, and durable joint 150 (FIG. 4) is formed between the pin 70 and plate 20.

Depending on the configuration and arrangement of the cutouts in the plate, differently shaped openings may be formed in the plate 20. For example, five cutouts result in a pentagonal opening being defined in the plate 20 while six cutouts result in an hexagonal opening being defined in the plate 20 when the pin 70 passes therethrough. In all of these configurations, flow spaces are defined between the plate 20 and the pin 70 into which the melted tab material 64 is flowable.

It is to be understood that various changes in the details, parts, materials, steps, and arrangements, that have been detailedly described and illustrated herein in order to described the nature of the pin to thin plate joint and method for making the joint, may be made by those skilled in the art within the principles and scope of the present pin to thin plate joint and method for making the joint. While embodiments of the pin to thin plate joint and method for making the joint have been described, this is for illustration not limitation.

What is claimed is:

1. A method for providing a pin to plate joint, comprising the steps of:
    a) providing the plate comprising an entry side, an exit side, and a thickness extending between the entry side and exit side,
    b) cutting the plate through the thickness thereof and forming a cutout pattern in the plate,
    c) providing the pin comprising a surrounding side wall extending to a contact end having a contact surface,
    d) aligning the contact end of the pin with the cutout pattern,
    e) moving the pin through the cutout pattern in the plate from the entry side to the exit side of the plate, the pin forcing on the cutout pattern and causing tabs to raise from the exit side of the plate at bends, the tabs orienting at an angle with respect to the exit side of the plate and moving into a closely spaced relationship with the pin side wall, there being spaces defined between the pin side wall and the plate,
    f) heating at least one of either the tabs or the pin, thus creating melted tab material that flows into the spaces between the pin side wall and the plate and wicking over the contact surface of the pin, and
    g) cooling the melted material between the pin side wall and the plate and that wicked over the contact surface of the pin to thereby form a robust pin to plate joint.

2. The method of claim 1 wherein the step of orienting the tabs at an angle with respect to the exit side of the plate further comprises orienting the tabs at substantially right angles to the exit side of the plate.

3. The method according to claim 1 wherein the cutout pattern comprises three cutouts radiating from a common geometrical point, each of the cutouts being at about 120 degrees from one another, so that three triangular-shaped tabs raise from the exit side of the plate upon moving the pin through the plate.

4. The method according to claim 1 wherein the act of heating comprises laser welding.

5. The method of claim 3 further comprising sizing the pin such that when it passes through the cutout pattern defined in the plate, it is in a close fitting relationship with the three triangular-shaped tabs.

6. The method according to claim 1 further comprising the act of providing the plate with a thickness of from about 0.002 inches to about 0.010 inches.

7. The method of claim 1 further comprising the step of providing the pin with a diameter of from about 0.014 inches to about 0.030 inches.

8. The method of claim 2 further comprising the acts of providing the tabs with tips and stopping movement of the pin through the plate when the contact surface of the pin is in the same plane as the tips of the tabs so that the pin to plate joint has a low profile with respect to the exit side of the plate.

9. The method of claim 1 further comprising selecting the materiel from which the plate is made from the group consisting of: nickel and titanium, and combinations thereof; and selecting the material from which the pin is made from the group consisting of; molybdenum, titanium, stainless steel, niobium, and combinations thereof.

10. The method according to claim 1 further comprising the acts of providing the pin and the plate each being of the same material so that the pin and plate fuse together upon heating.

11. A method of joining a plate to a pin, comprising the steps of:
   a) providing the plate comprising an entry side and an exit side,
   b) defining a plurality of cutouts in the plate, each cutout radiating from a common geometrical point and wherein each cutout is substantially the same length,
   c) providing the pin comprising a surrounding side wall extending to a contact end having a contact surface and aligning the contact end of the pin with the plurality of cutouts in the plate and generally at the common geometrical point,
   d) moving the pin through the plate at the location of the plurality of cutouts and the common geometrical point, thereby causing a plurality of tab members to raise and form at right angles with respect to the exit side of the plate, and stopping movement of the pin through the plate when the contact surface of the pin is recessed with respect to the plurality of tabs members with a plurality of flow spaces thus being defined between the pin and the plate,
   e) heating and melting the plurality of tab members so that they turn molten and flow into the plurality of flow spaces between the pin and plate and wick over the contact surface of the pin, and
   f) cooling the molten material between the pin side wall and the plate and that wicked into a cap over the contact surface of the pin, thereby forming a robust pin to plate joint.

12. The method according to claim 11 further comprising heating with a laser.

13. A method of joining a pin to a plate, comprising the steps of:
   a) defining a plurality of cutouts in the plate radiating from a common geometric point,
   b) providing the pin comprising a surrounding side wall extending to a contact end having a contact surface,
   c) moving the pin through the plurality of cutouts and causing a plurality of tabs to raise from the plate at a plurality of bends, wherein the tabs have tips lying in the same plane,
   d) stopping movement of the pin through the plate when the contact surface of the pin is coplanar with the plurality of tips, thereby defining a plurality of flow spaces between the pin and the plurality of bends, and
   e) melting the plurality of tabs so that the resulting molten material flows into the plurality of flow spaces.

14. The method according to claim 13 further comprising the steps of providing the plate with a thickness within the range of about 0.002 inches to about 0.010 inches, and the pin with a diameter of about 0.014 inches to about 0.030 inches.

15. The method according to claim 13 further comprising the steps of selecting the plate from the group consisting of: nickel and titanium, and mixtures thereof; and the pin from the group consisting of: molybdenum, titanium, stainless steel, and niobium, and mixtures thereof.

16. The method according to claim 13, wherein the material from which the plate is made has a melting temperature lower than or equal to the melting temperature of the pin.

17. A method of joining a pin to a plate, comprising the steps of;
   a) providing the pin,
   b) defining an arcuate cutout in the plate sized so the pin may pass therethrough in a close fitting relationship,
   c) moving the pin through the arcuate cutout and raising a curved shaped tab,
   d) welding the pin to the plate and melting the curved shaped tab, and
   e) cooling the pin to plate joint.

18. A method for forming a pin to a plate joint, comprising the steps of:
   a) providing the plate and defining three or more cutouts in the plate, the cutouts radiating from a common geometrical point such that the plate material between the cutouts takes on the form of triangular-shaped tabs,
   b) moving the pin through the plate from an entry side to the exit side of the plate, and in the process raising the triangular-shaped tabs at substantially right angles to the exit side of the plate, each triangular shaped tab comprising a tip,
   c) stopping the movement when a contact surface of the pin is substantially flush with the tips of the triangular-shaped tabs,
   d) laser welding the tabs causing them to melt and flow around the pin, and
   e) cooling the pin and plate forming a pin to plate joint.

19. The method according to claim 18 wherein the pin and plate are of the same material.

20. A method for forming a pin to a plate joint, comprising the acts of:
   a) providing the plate and defining a at least one U-shaped cutout in the plate,
   b) providing the pin comprising a surrounding side wall extending to a contact end having a contact surface,
   c) moving the pin through the plate from an entry side to an exit side of the plate, and in the process raising the U-shaped tab at substantially a right angle to the exit side of the plate,
   d) defining flow spaces between the U-shaped tab and the pin,
   e) providing a means for heating the U-shaped tab and causing it to melt and flow into the spaces between the pin side wall and the plate and wicking over the contact surface of the pin, and f) cooling the pin and plate to finish farming the pin to plate joint.

21. The method according to claim 20, wherein the plate comprises a thickness of about 0.002 inches to about 0.010 inches and the pin comprises a thickness of about 0.014 inches to about 0.030 inches.

22. A method for providing a pin to plate joint, comprising the steps of:
   a) providing the plate comprising an entry side, an exit side, and a thickness extending between the entry and exit sides,
   b) cutting the plate through the thickness thereof and forming a cutout pattern in the plate,
   c) providing the pin comprising a surrounding side wall extending to a contact end having a contact surface,
   d) aligning the contact end of the pin with the cutout pattern,
   e) moving the pin through the cutout pattern in the plate from the entry side to the exit side thereof, the pin forcing on the cutout pattern and causing tabs to raise from the exit side at bends, the tabs orienting at an angle with respect to the exit side of the plate and moving into a closely spaced relationship with the pin side wall, wherein the tabs have tips and the contact end of the pin has a contact surface and stopping movement of the pin through the plate when the contact surface is in the same plane as the tips of the tabs, there being spaces defined between the pin side wall and the plate,
   f) heating at least one of either the tabs or the pin, thus creating melted tab material that flows into the spaces between the pin side wall and the plate, and
   g) cooling the melted tab material to thereby form a robust pin to plate joint.

23. A method for providing a pin to plate joint, comprising the steps of:
   a) providing a plate comprising an entry side, an exit side, and a thickness extending between the entry and exit sides,
   b) cutting the plate through the thickness thereof and forming a cutout pattern in the plate,
   c) providing the pin comprising a surrounding side wall extending to a contact end having a contact surface,
   d) aligning the contact end of the pin with the cutout pattern,
   e) moving the pin through the cutout pattern in the plate from the entry side to the exit side thereof, the pin forcing on the cutout pattern and causing tabs to raise from the exit side at bends, the tabs orienting at an angle with respect to the exit side of the plate and moving into a closely spaced relationship with the pin side wall, there being spaces defined between the pin side wall and the plate,
   f) providing the pin and the plate being of the same material and heating at least one of them, thus creating melted tab material that flows into the spaces between the pin side wall and the plate, and
   g) cooling the melted material to thereby form a robust pin to plate joint.

24. A method of joining a plate to a pin, comprising the steps of:
   a) providing, the plate comprising an entry side and an exit side
   b) defining a plurality of cutouts in the plate, each cutout radiating from a common geometrical point and wherein each cutout is substantially the same length,
   c) providing the pin comprising a surrounding side wall extending to a contact end having a contact surface and aligning the contact end of the pin with the plurality of cutouts in the plate and generally at the common geometrical point,
   d) moving the pin completely through the plate at the location of the plurality of cutouts and the common geometrical point, thereby causing a plurality of tab members to raise and form at right angles with respect to the exit side of the plate, and stopping movement of the pin through the plate when the contact surface of the pin extends a distance away from the plurality of tab members with a plurality of flow spaces thus being defined between the pin and the plate,
   e) heating and melting the plurality of tab members so that they turn molten and flow into the plurality of flow spaces between the pin and plate and forming a ring of melted material about the pin, and
   f) cooling the ring of molten material, thereby forming a robust pin to plate joint.

* * * * *

UNITED STATES PATENT AND TRADEMARK OFFICE
CERTIFICATE OF CORRECTION

PATENT NO. : 6,781,088 B2
DATED : August 24, 2004
INVENTOR(S) : Kenneth Grubb et al.

It is certified that error appears in the above-identified patent and that said Letters Patent is hereby corrected as shown below:

Column 7,
Line 16, "materiel" should read -- material --;

Column 8,
Line 33, "steps of:" should read -- steps of; --;
Line 54, "a at least" should read -- at least -- ; and Column 9,
Line 1, "farming" should read -- forming --.

Signed and Sealed this

Fifth Day of April, 2005

JON W. DUDAS
*Director of the United States Patent and Trademark Office*